United States Patent [19]

Foss

[11] Patent Number: 5,405,694
[45] Date of Patent: Apr. 11, 1995

[54] STUFFING

[75] Inventor: Lars Foss, Copenhagen, Denmark

[73] Assignee: Fossnit A/S, Kvistgaard, Denmark

[21] Appl. No.: 161,306

[22] Filed: Dec. 2, 1993

Related U.S. Application Data

[63] Continuation of Ser. No. 974,323, Nov. 10, 1992, abandoned, which is a continuation of Ser. No. 773,944, Nov. 25, 1991, abandoned.

[30] Foreign Application Priority Data

Jun. 2, 1989 [DK] Denmark ............................ 2719/89

[51] Int. Cl.$^6$ ............................................. D02G 3/00
[52] U.S. Cl. ................................... 428/359; 428/357; 428/402; 428/397; 428/401; 428/141; 264/140; 264/141
[58] Field of Search .................. 264/140, 141; 521/79, 521/143, 144; 526/352; 428/359, 357, 141, 402, 403, 401, 397

[56] References Cited

U.S. PATENT DOCUMENTS

| | | | |
|---|---|---|---|
| 3,046,606 | 7/1962 | Carter | 264/141 |
| 3,188,295 | 6/1965 | Ballast et al. | 521/79 |
| 3,488,746 | 1/1970 | Gilbert | 521/79 |
| 3,558,753 | 1/1971 | Edlin | 521/79 |
| 3,887,672 | 6/1975 | Stahnecker | 264/51 |
| 4,110,499 | 8/1978 | Harrison | 428/357 |
| 4,171,401 | 10/1979 | Legrix et al. | |
| 4,387,169 | 6/1983 | Zabrocki et al. | 521/79 |
| 4,481,256 | 11/1984 | Masuda et al. | 428/357 |
| 4,501,711 | 2/1985 | Senuma et al. | 521/79 |
| 4,522,955 | 6/1985 | Fukushima et al. | 521/79 |
| 4,560,074 | 4/1987 | Conley et al. | 521/79 |
| 4,606,965 | 8/1986 | Bussey | 521/79 |
| 4,656,197 | 4/1987 | Yoshimura et al. | 428/357 |
| 4,923,651 | 5/1990 | Hill | 264/140 |

FOREIGN PATENT DOCUMENTS

| | | |
|---|---|---|
| 538425 | 5/1973 | Switzerland . |
| 1131505 | 6/1973 | Switzerland . |
| 977872 | 12/1964 | United Kingdom . |

Primary Examiner—N. Edwards
Attorney, Agent, or Firm—Oliff & Berridge

[57] ABSTRACT

A stuffing comprises a plurality of preferably loosely disposed individual stuffing elements of an elastic material. Each stuffing element is shaped as a thin foil-like sheet with at least one curvature. The stuffing is formed from a starting object which preferably comprises a plastic material that is worked in a cold or a hot state to form the stuffing elements. Various semi-manufactured articles of plastics, such as foils, sheets and rods may be used as the stuffing material, and the stuffing elements may moreover be produced directly from a plastics granulate. The stuffing is advantageously used for bedclothes such as eiderdowns and pillows, mattresses, upholstered furniture, and as insulation in houses and thermal installations in general.

9 Claims, 3 Drawing Sheets

STUFFING

This is a continuation of application Ser. No. 07/974,323, filed Nov. 10, 1992, now abandoned, which in turn is a continuation of application Ser. No. 07/773,994, filed Nov. 25, 1991, now abandoned.

BACKGROUND OF THE INVENTION

The invention concerns a stuffing which consists of a plurality of preferably loosely disposed individual stuffing elements of an elastic material.

Stuffing of this type is widely used for pillows, eiderdowns and similar bedclothes, for padding or mattresses and upholstered furniture and as thermal insulation in, e.g., buildings. Originally, the only stuffing that had been used was naturally occurring products, such as down, feathers, kapok and curled hair. Currently, a wide choice of artificially produced materials, such as foamed plastics and fibers of varying materials, such as plastics, glass and stone, is also available.

The known art comprises a variety of artificial materials for making artificial straw for stable-litters, for protection of fragile articles, and for stuffing.

Thus, U.S. Pat. No. 4,171,401 describes artificial straw to replace conventional straw for making stable-litters to be used by animals such as horses and bovines.

The dimensions of this artificial straw (in a flat and stretched condition) is indicated to be within the following intervals or ranges:

|  | GENERAL | PREFERRED | PART. PREFERRED |
| --- | --- | --- | --- |
| Thickness ($\mu$m) | 60–800 | 100–600 | 150–500 |
| Length (mm) | 30–800 | 100–600 | 150–400 |
| Width (mm) | 1–20 | 2–15 | 2.5–8 |

The aspect ratio (i.e., the ratio of length/width) for the artificial straw thus lies within the interval 1.5–800, preferably 7–300, and particularly preferred is the interval or range 18–160.

CH Patent Specification No. 538,425 describes a material for protection of fragile articles, e.g., during transportation, comprising oval, saddle-shaped plates of foamed plastics and a method of producing this material comprising a final foaming step.

Typical dimensions for the unfoamed intermediate product are: Length: 3–20 mm, Width: 2–10 mm, Thickness: 800–3000 $\mu$m.

This intermediate product is then subjected to a foaming step whereby the size of the particles is increased by a factor 3–4.

DE Patent Specification No. 1,131,505 describes a stuffing material for upholstering, and for heat and sound insulation consisting of a number of flexible, corrugated plastics strips which are inter-bonded with a specific binder.

GB Patent Specification No. 977,872 describes a stuffing material for cushions, mattresses, quilts and the like and for packing comprising a multiplicity of randomly entangled regular shaped foam resin filaments having roughened surfaces to effect interlocking between contacting filaments.

In all cases the consumption of stuffing is very considerable, and it is therefore generally required that the stuffing must be available at a reasonable price, and that it must be easy and safe to work with the stuffing, but the stuffing must at the same time also be capable of complying with a large number of technical specifications which can vary from one application to the other, but which generally comprise standards of density, elastic deformability, insulation capacity and washability, and in most cases the stuffing must additionally be flame retardant and may not cause discomfort to the allergics. However, it has been found that the known stuffing materials, in spite of their variety, have not in all cases been fully capable of satisfying the above-mentioned requirements.

SUMMARY OF THE INVENTION

The object of the invention is to provide a stuffing of the type mentioned that is adapted to overcome the shortcomings of the prior art.

This object is achieved in that the stuffing of the present invention comprises stuffing elements each shaped as a thin foil-like piece of sheet with at least one randomly oriented curvature. Each stuffing element has a thickness within the interval or range of 1–75 $\mu$m, preferably 5–30 $\mu$m, and in particular 1–20 $\mu$m, as well as an extent or length within the interval or range of 1–100 mm, preferably 1–30 mm, and in particular 1–15 mm.

The stuffing will be relatively inexpensive to produce and also be very light and elastic since an air volume very large in percentage occurs between the stuffing elements, and the individual elements will act as leaf springs that elastically transfer forces from a possible load from one element to the other. When stuffing elements of various sizes, thicknesses and configurations are mixed, the stuffing of the invention may additionally be adapted carefully to the various applications.

Further, according to the invention, the elastic material may be a plastics material, it being achieved in connection with the configuration of the stuffing that the stuffing can easily be cleaned by, e.g., boiling and autoclaving at bacteria-killing temperatures, and when the plastics material is additionally cross-linked, the strength and elasticity of each individual plate-shaped stuffing element will be equally good in all directions.

Moreover, in an advantageous embodiment of the invention, the plastics material may belong to the group of polyethylene, polypropylene, polyester, polyvinyl chloride and polyvinyl acetate, or may be physical mixtures, copolymers and laminates of these. The stuffing hereby obtains great strength and elasticity and will not cause any discomfort to allergics. If polyethylene or polypropylene is used, the stuffing will moreover be flame retardant.

Additionally, according to the invention, the plastics material may contain a large number of evenly distributed small air cells to obtain a particularly light stuffing having a good thermal insulation capacity.

The invention also concerns a method of making the above-mentioned stuffing, and this method is characterized according to the invention by providing a starting object, preferably of plastics, and then forming from said object in cold or hot state a plurality of stuffing elements in the form of thin, foil-like pieces of sheet. Accordingly, commercially available semi-manufactured articles may be used for the production of the stuffing elements.

Thus, according to the invention, a plastics sheet may be used as starting object, which is torn and/or cut into suitable pieces of sheet, each of which is permanently deformed with at least one curvature or a starting object with a relatively large thickness may be used, which is reduced to the intended thickness of the stuffing element, preferably by rolling or pressing with simultaneous or subsequent tearing and/or cutting into suitable pieces of sheet, each of which is deformed permanently with at least one curvature.

In a particularly expedient embodiment of the method of the invention the stuffing element may be formed from their respective, e.g., ball-shaped or polyhedral, relatively thick starting objects, which are rolled or pressed down to a piece of sheet with desired thickness and at least one curvature. Accordingly, the stuffing elements may be produced directly from a suitable plastics granulate.

Particularly great strength and elasticity requirements may be achieved using a curable plastics material, which may additionally be reinforced with, e.g., glass fiber. According to the invention, a starting object in the form of a rod, tube, block or sheet with a relatively large thickness is subjected to chipping, working, such as turning, milling or planing, to form a plurality of stuffing elements in the form of thin, foil-like pieces of sheet.

Finally, according to the invention, there may be added to the treatment zone in which the forming of the stuffing elements takes place, a cooling and lubricating liquid having such a consistency and composition that the liquid upon drying leaves a rubber-like coating or the resulting stuffing elements. This improves the wear resistance of the stuffing elements and reduces or eliminates the noise which may occur when the stuffing elements rub against each other.

The invention additionally concerns a use of the above-mentioned stuffing, which is characterized according to the invention in that the stuffing is used for stuffing bedclothes, such as pillows or eiderdowns, for padding of mattresses and upholstered furniture, and as thermal insulation in, e.g., houses, refrigerating furniture and similar thermal installations.

BRIEF DESCRIPTION OF THE DRAWINGS

The invention will be explained more fully below with reference to the drawings, in which.

DETAILED DESCRIPTION OF PREFERRED EMBODIMENTS

Figure 1:
FIG. 1 shows part of a stuffing of the invention.
Figure 2:
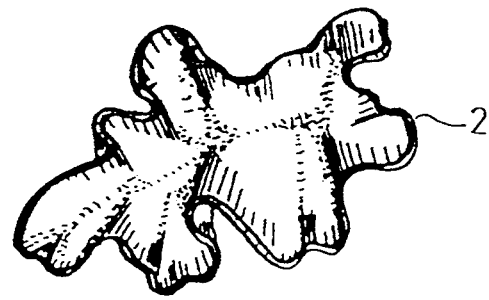
FIG. 2 shows a single one of the stuffing elements belonging to the stuffing shown in FIG. 1.

FIG. 1 shows part of a stuffing which is generally indicated by 1 and consists of a large number of stuffing elements 2, which are disposed in a random order in loose contact with each other. FIG. 2 shows by way of example a single one of these stuffing elements 2 consisting of a thin, foil-like piece of sheet, which in this case curves in many directions. Further, this piece of sheet may have any contour and any shape, but must in all cases have at least one curvature and must be made of an elastic material, such as plastics.

When the stuffing 1 is subjected to a load, the forces are transferred from one stuffing element 2 to another stuffing element 2 through the overall stuffing, whereby each individual stuffing element will bend in a proportion corresponding to the size and direction of the forces. Since, however, the moment of resistance to such bending is inversely proportional to the third power of the thickness, and since this, as mentioned, is extremely small, each individual stuffing element can stand a considerable degree of bending without receiving permanent deformations, so that the stuffing as whole is given a surprisingly good elastic deformability, which can moreover be adapted to any desired purpose by suitable selection of material and shaping of the individual stuffing elements.

A plastics material from the group of polyethylene, polypropylene, polyester, polyvinyl chloride and polyvinyl acetate, or physical mixtures, copolymers and laminates of these are preferably used for the making of the stuffing, so that the stuffing obtains a particularly good strength and elasticity as well as, when the plastics is cross-linked, in particular uniform mechanical properties in all directions. The stuffing can at the same time be washed by, e.g., boiling and autoclaving at bacteria-killing temperatures and causes no discomfort to allergics. When the material is polyethylene or polypropylene the stuffing will moreover be flame retardant.

In consequence of the large percentage of air, which occurs naturally between the stuffing elements, the stuffing has an advantageous small density and excellent thermal insulation capacity. These properties may be improved additionally by using a plastics material which itself contains a multitude of small air cells (not shown).

The stuffing may particularly be adapted to the individual applications by mixing stuffing elements having various thicknesses, sizes and configurations. Each stuffing elements then has a thickness of between 1 and 75 $\mu$m, preferably between 5 and 30 $\mu$m and in particular between 10 and 20 $\mu$m, as well as an extent or length of between 1 and 100 mm, preferably between 1 and 30 mm, and in particular between 1 and 15 mm.

Figures 3, 4:
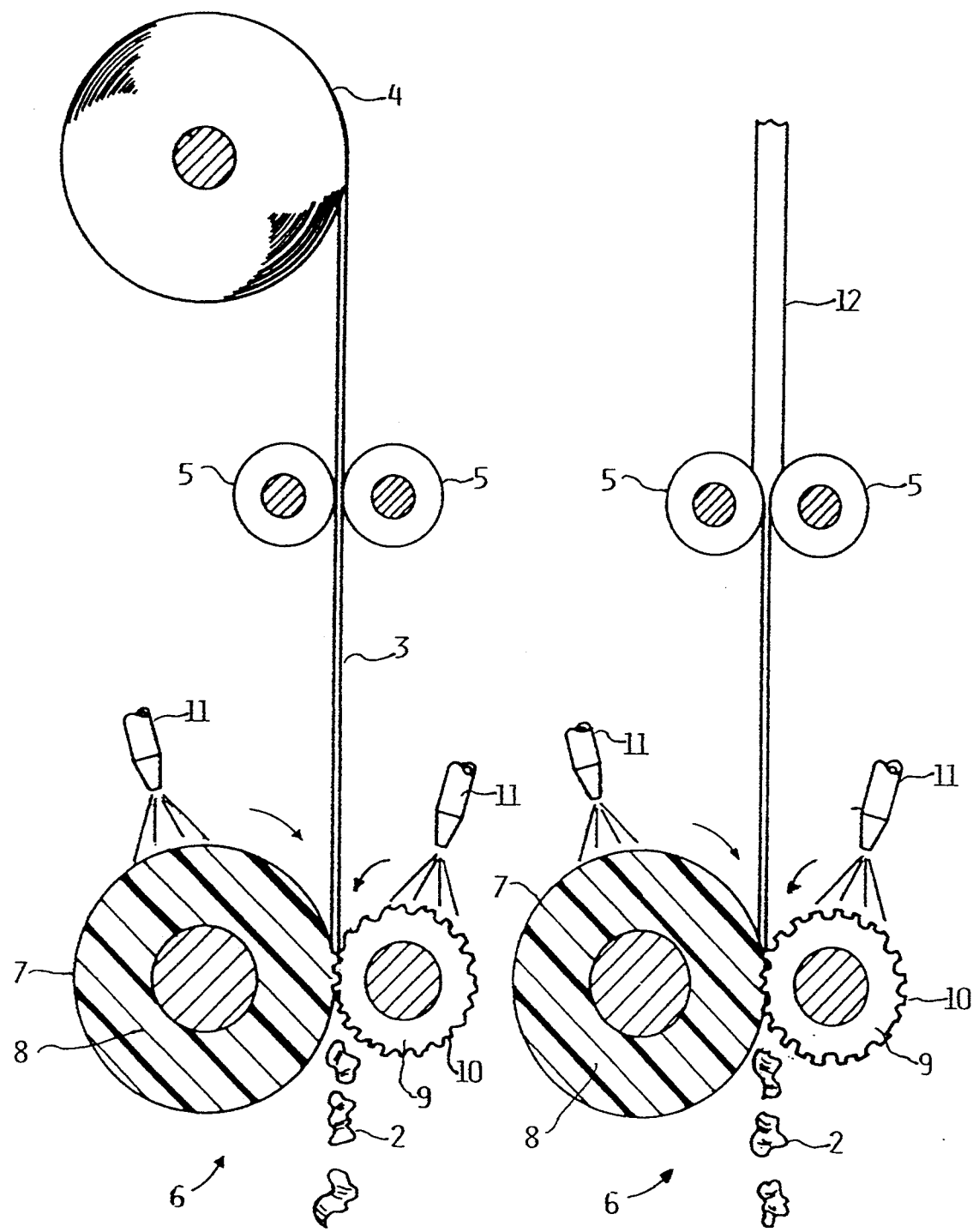
FIG. 3 shows schematically how the stuffing elements are produced on the basis of a plastics sheet.
FIG. 4 shows schematically how the stuffing elements are produced on the basis of a relatively thick, elongate starting object or plastics.

FIG. 3 schematically shows a plant for producing the stuffing elements 2. A plastics sheet 3 with a thickness corresponding to the finished stuffing elements 2 are pulled by means of a pair of rollers 5 from a supply reel 4, and is fed successively to a working station which is generally indicated by 6. The actual forming of the stuffing elements 2 takes place in this station, the sheet 3 being torn and/or cut into suitable pieces of sheet, which are simultaneously deformed so as to obtain the desired shape. In the example shown in FIG. 3, the working station 6 consists of a generally relatively large roller 7 with a web 8 of e.g., a suitable hard rubber, and a smaller shaping roller 9 which consists of hardened steel and has a suitable pattern 10 in the surface. When the rollers 7, 9 rotate in the direction shown by the arrows, the rubber web 8 of the roller 7 will be pressed into the pattern 10 of the roller 9 with the plastics sheet 3 between these, so that the sheet is cut into suitable pieces 2 which simultaneously receive an imprint of the pattern 10 of the roller 9. According to the shape of this pattern, the stuffing elements 2 may thus be formed with any desired configuration.

The mechanical properties of the finished stuffing elements 2, including strength and elasticity, depend partly upon the working degree, partly upon the starting material 3. If this is a hard, elastic material, the process can advantageously be caused to proceed in a hot state by heating the plastics sheet 3 by suitable heating means (not shown) before the actual working. Additionally, a cooling and lubricating agent may be added during the working process via nozzles 11, and the cooling and lubricating agent may have a composition such that the liquid upon drying leaves a rubber-like coating on the stuffing elements. The wear resistance of the individual stuffing elements is increased hereby, and any noise from mutual rubbing of the elements in used is reduced or eliminated completely, which is advantageous in particular when the stuffing is used for bedclothes, such as pillows and eiderdowns.

FIG. 4 shows a second plant for producing the stuffing elements 2. This plant corresponds completely to the one shown in FIG. 3, except that the plastics sheet 3 is replaced by a starting object 12 having a relatively large thickness, which is then rolled in cold or hot state down to sheet thickness by means of the rollers 5. Commercially available semi-manufactured articles in the form of, e.g., sheets and rods may advantageously be used as the starting place in the same manner as described above with reference to FIG. 3 and will therefore not be discussed additionally here.

Figure 5:
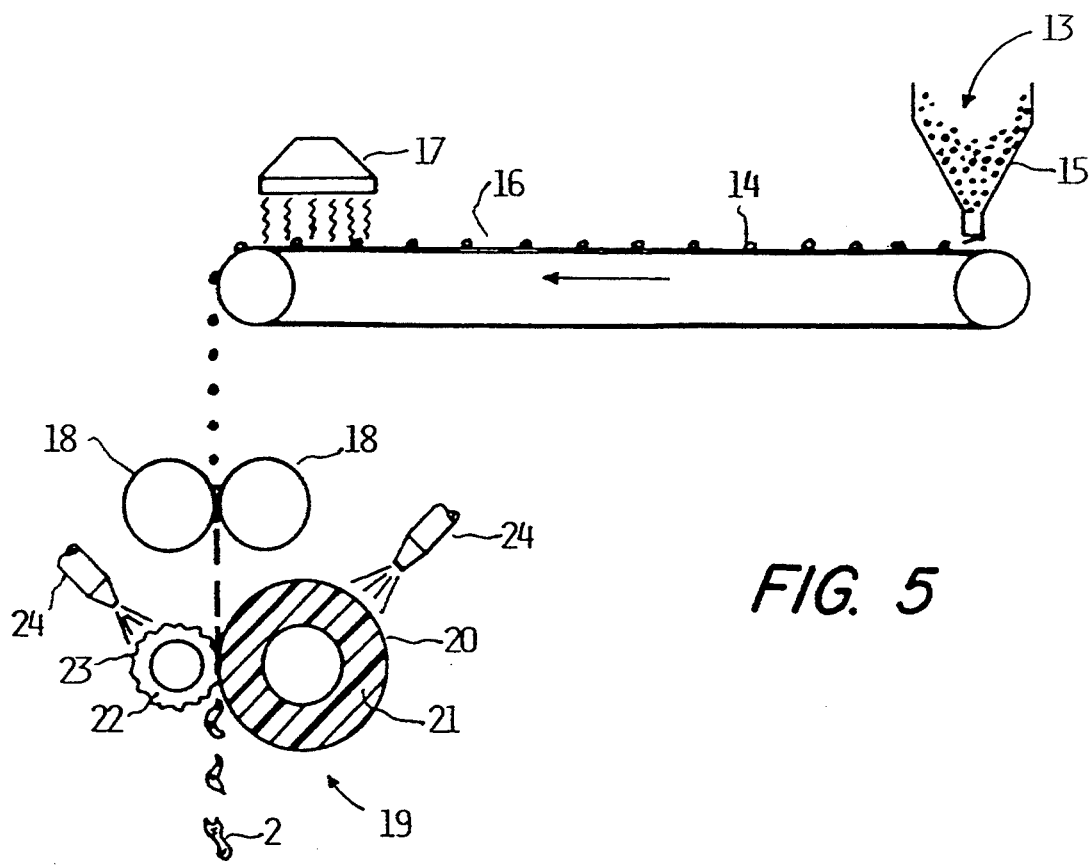
FIG. 5 shows schematically how the stuffing elements are produced on the basis of a plastics granulate.

FIG. 5 schematically shows a third plant for producing the stuffing elements 2. In this case the starting material is a suitable finely divided granulate 13 which is stored in a supply hopper 15 from which the individual grains 14 of the granulate 13 are added mutually spaced to an endless belt conveyor 16 which feeds the grains 14 in the direction shown by the arrow. The grains are heated during this movement with a heating means 17 by, e.g., radiant heat or hot air, following which the grains now heated drop vertically down between two front rollers 18, which roll the individual grains down to a suitable thickness, following which they continue to a working station 19 where the grains 14 are shaped to the final shape of the stuffing elements 2. In this case too, the working station comprises a relatively large roller 20 with a suitable hard rubber web 21 and a smaller shaping roller 22 with a pattern 23 in the surface. A cooling and lubricating agent is added via spray nozzles 24, and the working station 19 generally operates in quite the same manner as described with reference to FIGS. 3 and 4; however, the pattern 23 in the shaping roller 22 is not provided with cutting members since each individual grain automatically becomes a stuffing element so that the often complicated tearing or cutting processes is eliminated in the case. Another advantage provided by the plant shown in FIG. 5 is that the plant is capable of producing the stuffing elements directly from a granulate, thereby completely obviating the often considerably costs incidental to first producing a semimanufacture of the granulate.

Figure 6:
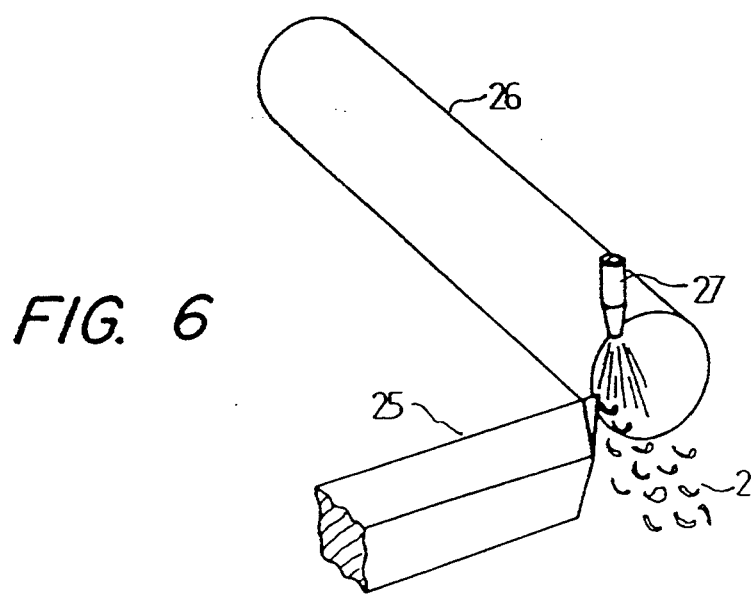
FIG. 6 shows schematically how the stuffing elements are produced as chips removed by turning from a plastics rod.

Finally, FIG. 6 schematically shows a fourth plant for producing the stuffing elements 2, which are produced by chipping of a rod, tube, block or plate with a relatively large thickness by means of chipping working, such as turning, milling or planing. This plant provides a simultaneous supply of a cooling and lubricating agent from a spray nozzle 27, and a rod 26 is turned by means of a turning tool 25 into turnings 2, each of which forms an individual stuffing element. The particular advantage of this embodiment of the method is that very strong and elastic plastics materials may be used, e.g., curable and, optionally, additionally reinforced plastics materials, as well as hard and elastic foamed plastics materials from which particularly light, elastic and thermally insulating stuffing elements may be formed.

The stuffing described above is suitable for a large number of various purposes.

These include, e.g., bedclothes, such as eiderdowns and pillows where the stuffing can advantageously replace, e.g., down and feathers, owing to the lightness and soft, elastic deformability of the stuffing as well as its ability to withstand boiling and autoclaving at bacteria-killing temperatures. In addition the stuffing does not cause any discomfort to allergics, which is of great importance in particular when the stuffing is to be used for bedclothes at hospitals and similar institutions.

The stuffing may also be adapted so that it can withstand rather huge loads, and this variant is useful in particular for padding of mattresses and upholstered furniture.

Owing to the great thermal insulation capacity of the stuffing, it may moreover be used as insulation in houses and thermal installations in general. A stuffing whose material contains a large number of evenly distributed small air cells is particularly useful for this purpose.

I claim:

1. A stuffing for use in bed clothes, mattresses, upholstered furniture, and thermal insulators comprising:
   a plurality of loosely disposed individual, elastic stuffing elements, each stuffing element comprising a thin sheet having a thickness within the range of 1–75 $\mu$m and a length within the range of 1–100 mm, each stuffing element having an asymmetrical shape including a plurality of randomly oriented bends.

2. A stuffing according to claim 1, wherein the elastic stuffing elements are comprised of a plastics material.

3. A stuffing according to claim 2, wherein the plastics material is selected from the group of polyethylene, polypropylene, polyester, polyvinyl chloride and polyvinyl acetate or from physical mixtures, copolymers and laminates of these.

4. A stuffing according to claim 2, wherein the plastics material contains a large number of evenly distributed small air cells.

5. A stuffing according to claim 2, wherein the plastics material comprises a cross-linked plastics material.

6. A stuffing according to claim 1, wherein said stuffing comprises stuffing elements of various thicknesses and lengths.

7. The stuffing according to claim 1, wherein said predetermined thickness is in the range of 5–30 $\mu$m and said length is in the range of 1–30 mm.

8. The stuffing according to claim 1, wherein said predetermined thickness is in the range of 10–20 $\mu$m and said length is in the range of 1–15 mm.

9. The stuffing according to claim 1, wherein contacting stuffing elements include a large space therebetween.

* * * * *